United States Patent
Shan et al.

(10) Patent No.: US 8,805,389 B2
(45) Date of Patent: Aug. 12, 2014

(54) METHOD AND APPARATUS FOR SYNCHRONIZING QUIET PERIOD IN COGNITIVE RADIO SYSTEM

(75) Inventors: Cheng Shan, Gyeonggi-do (KR); Eun-Taek Lim, Gyeonggi-do (KR); Jung-Soo Woo, Gyeonggi-do (KR); Ho-Dong Kim, Gyeonggi-do (KR); Sang-Bum Kim, Seoul (KR); Yong-Ho Park, Chungcheongnam-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 871 days.

(21) Appl. No.: 12/655,797

(22) Filed: Jan. 7, 2010

(65) Prior Publication Data

US 2010/0203914 A1 Aug. 12, 2010

(30) Foreign Application Priority Data

Jan. 7, 2009 (KR) ........................ 10-2009-0001144

(51) Int. Cl.
*H04W 72/00* (2009.01)

(52) U.S. Cl.
USPC ....................................... 455/452.1

(58) Field of Classification Search
USPC ............ 455/447, 450, 452.1, 454, 455, 63.1, 455/67.11; 370/445, 450, 437, 468, 447, 370/448
See application file for complete search history.

(56) References Cited

U.S. PATENT DOCUMENTS

| | | | |
|---|---|---|---|
| 6,219,559 B1 * | 4/2001 | Hill et al. ...................... | 455/522 |
| 7,424,268 B2 * | 9/2008 | Diener et al. .................. | 455/62 |
| 2004/0125753 A1 * | 7/2004 | Mahany et al. ............... | 370/254 |
| 2008/0090581 A1 * | 4/2008 | Hu .............................. | 455/452.1 |
| 2008/0108366 A1 * | 5/2008 | Hu .............................. | 455/452.1 |
| 2008/0219286 A1 * | 9/2008 | Ji et al. ........................ | 370/445 |
| 2008/0225878 A1 * | 9/2008 | Cordeiro et al. ............. | 370/437 |

* cited by examiner

*Primary Examiner* — Yuwen Pan
*Assistant Examiner* — Mark Woodall

(57) ABSTRACT

A method and apparatus for synchronizing a Quiet Period (QP) in a Cognitive Radio (CR) system includes receiving QP information based on a channel N from at least one neighbor BS. The method further includes determining whether the channel N is an in-band channel. If the channel N is the in-band channel, QP scheduling is performed according to the received QP information based on the channel N.

14 Claims, 6 Drawing Sheets

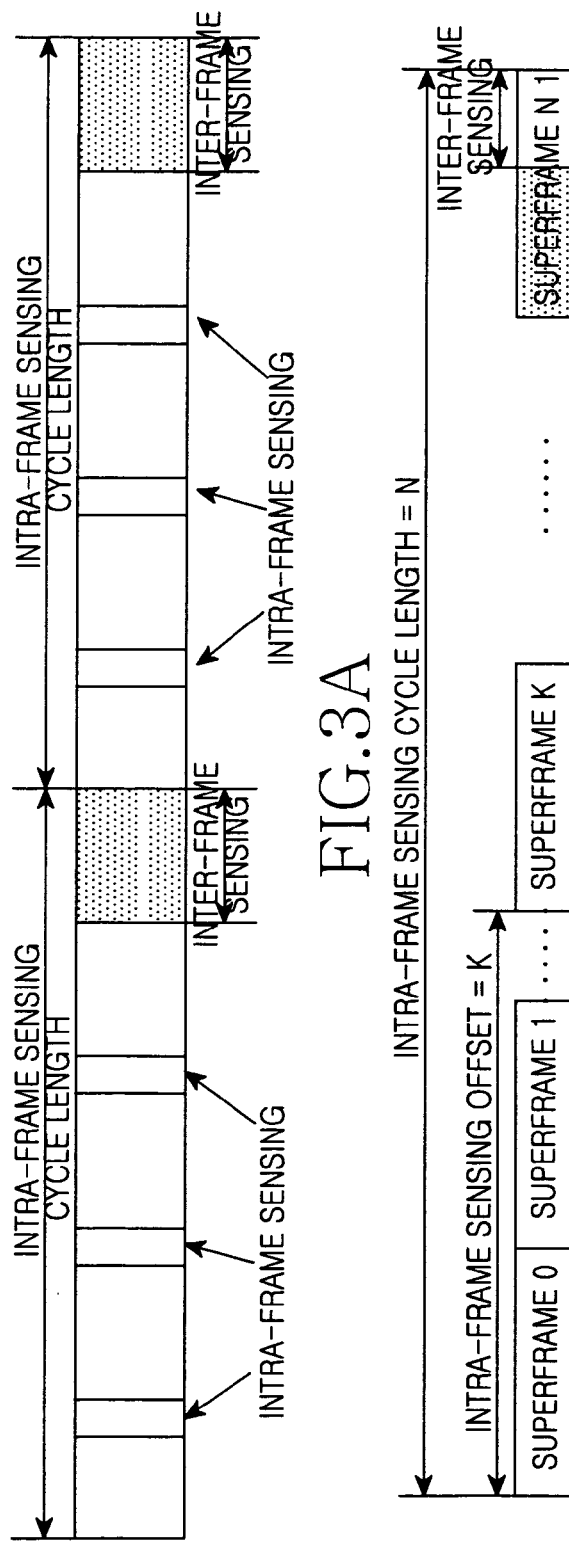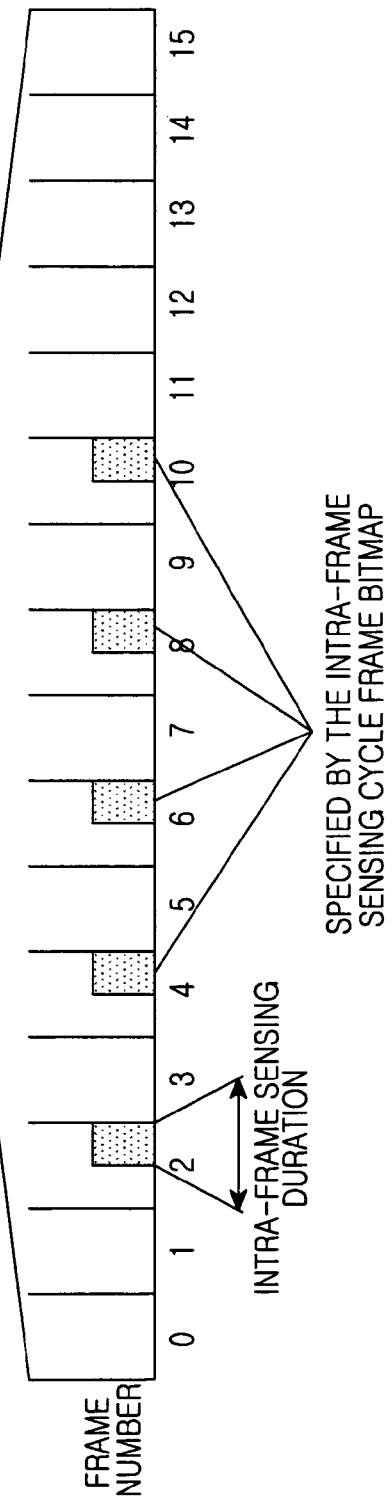
FIG.3A
FIG.3B

METHOD AND APPARATUS FOR SYNCHRONIZING QUIET PERIOD IN COGNITIVE RADIO SYSTEM

CROSS-REFERENCE TO RELATED APPLICATION(S) AND CLAIM OF PRIORITY

The present application is related to and claims priority under 35 U.S.C. §119 of an application filed in the Korean Intellectual Property Office on Jan. 7, 2009 and assigned Serial No. 10-2009-0001144, the entire disclosure of which is hereby incorporated by reference.

TECHNICAL FIELD OF THE INVENTION

The present invention relates to a Cognitive Radio (CR) system. More particularly, the present invention relates to a method and apparatus for synchronizing a Quiet Period (QP) in a CR system.

BACKGROUND OF THE INVENTION

When a Cognitive Radio (CR) system co-exists with a primary system (e.g., a broadcast system), that is, when a CR system shares a frequency band of the primary system, the CR system has to sense the primary system either periodically or according to a pre-defined procedure in order to avoid interference to the primary system. In general, compared with out-band channels in which the CR is not operating, the sensing process is more frequently performed through in-band channels in which the CR system is operating.

According to the Institute of Electrical and Electronics Engineers (IEEE) 802.22 standard, the CR system operates through one TeleVision (TV) channel. As defined in this standard, the in-band channels include not only neighbor channels N+1 and N−1 but also a channel N currently in use.

In order to perform the sensing process through the in-band channels, the CR system has to terminate communication using the sensed in-band channels. A sensing period is referred to as a Quiet Period (QP). Neighbor cells operating through the in-band channels also have to terminate transmission during the QP to improve sensing capability.

Meanwhile, in a case where a plurality of CR systems co-exist, if the plurality of CR systems operate through the same channel or neighbor channels, QP scheduling is necessary to avoid mutual interference. To allow the QP scheduling, QP scheduling information has to be shared between the CR systems. In other words, the QP scheduling information has to be broadcast to the neighbor cells so that the neighbor cells follow a scheduled QP. According to the IEEE 802.22 standard, the QP scheduling information is broadcast by using a Superframe Control Header (SCH) or a Coexistence Beacon Protocol (CBP) packet.

FIGS. 1A, 1B and 1C illustrate an example of QP scheduling according to the prior art.

Referring to FIG. 1A, if it is assumed that cells 1, 2, 3, and 4 respectively use channels N, N+1, N+2, and N+3, the cell 1 schedules and broadcasts a QP for the channel N. In this case, the cell 2 using the channel N+1 performs QP scheduling of the channel N+1 by considering QP scheduling of the cell 1. The channels N+1 and N−1 are in-band channels of the channel N. The in-band channel synchronizes QP scheduling.

Thereafter, the cell 2 using the channel N+1 adjusts timing to the QP scheduling of the cell 1 and broadcast QP scheduling information of the cell 2. In this case, the cell 3 using the channel N+2 performs QP scheduling of the channel N+2 by considering the QP scheduling of the cell 2. The channels N and N+2 are in-band channels of the channel N+1.

Thereafter, the cell 3 using the channel N+2 adjusts timing to the QP scheduling of the cell 2 and broadcast QP scheduling information of the cell 3. In this case, the cell 4 using the channel N+3 regulates QP scheduling of the channel N+3 by considering the QP scheduling of the cell 3. The channels N+1 and N+3 are in-band channels of the channel N+2. Therefore, the QP scheduling of the cell 1 propagates up to the cell 4.

However, the cell 4 does not operate in the in-band channel of the cell 1. That is, although the cell 1 uses the channel N and the cell 4 uses the channel N+3, the cell 4 is synchronized to QP scheduling timing of the cell 1. As a result, QP scheduling of an out-band channel is unnecessarily performed, thereby decreasing overall system throughput.

Referring to FIG. 1B, if it is assumed that cells 1, 2, and 3 respectively use channels N, N−1, and N+1, similarly to FIG. 1A, the cell 2 using the channel N−1 adjusts timing to QP scheduling of the cell 1 and broadcasts QP scheduling information of the cell 2. Since the channel N+1 and the channel N−1 are not in-band channels with each other, the cell 3 using the channel N+1 ignores QP scheduling information of the cell 2 using the channel N−1. However, since the cell 1 using the channel N and the cell 3 using the channel N+1 use in-band channels, QP scheduling has to be synchronized.

Referring to FIG. 1C, if it is assumed that cells 1, 2, and 3 respectively use channel N, M, and N, the cell 2 using the channel M which is an out-band channel of the channel N ignores QP scheduling information from the cell 1 and broadcast QP scheduling information for the channel M. Likewise, the cell 3 ignores QP scheduling information for the channel M. However, since the cell 1 and the cell 3 have to use the same channel N, QP scheduling has to be synchronized.

As described above, a problem arises in the conventional method when QP scheduling synchronization is not provided to neighbor BSs using an in-band channel and when unnecessary QP scheduling synchronization is provided to neighbor BSs using an out-band channel.

SUMMARY OF THE INVENTION

To address the above-discussed deficiencies of the prior art, it is a primary aspect of the present invention to solve at least the above-mentioned problems and/or disadvantages and to provide at least the advantages described below. Accordingly, an aspect of the present invention is to provide a method and apparatus for sharing Quiet Period (QP) scheduling information in a Cognitive Radio (CR) system.

Another aspect of the present invention is to provide a method and apparatus for synchronizing QP scheduling in a CR system.

In accordance with an aspect of the present invention, a method of synchronizing a QP in a CR system is provided. The method includes receiving QP information based on a channel N from at least one neighbor BS, determining whether the channel N is an in-band channel, and if the channel N is the in-band channel, performing QP scheduling according to the received QP information based on the channel N.

In accordance with another aspect of the present invention, an apparatus for synchronizing a QP in a CR system is provided. The apparatus includes a receiver that receives QP information based on a channel N from at least one neighbor BS, a controller that determines whether the channel N is an in-band channel, and a QP scheduling manager that performs QP scheduling according to the received QP information based on the channel N if the channel N is the in-band channel.

In accordance with another aspect of the present invention, a method of synchronizing a QP in a CR system is provided. The method includes receiving QP information based on a channel N from at least one neighbor BS, determining whether the channel N is an in-band channel, and if the channel N is an out-band channel, relaying the QP information on the out-band channel to another neighbor BS.

In accordance with another aspect of the present invention, a method of synchronizing a QP in a CR system is provided. The method includes determining a channel for QP scheduling among a channel N and neighbor channels of the channel N, configuring control information including QP scheduled channel information, and broadcasting the control information including QP scheduled channel information.

In accordance with another aspect of the present invention, an apparatus for synchronizing a QP in a CR system is provided. The apparatus includes a receiver that receives QP information based on a channel N from at least one neighbor BS, a controller that determines whether the channel N is an in-band channel, and a QP scheduler that relays the QP information on an out-band channel to another neighbor BS if the channel N is the out-band channel.

In accordance with another aspect of the present invention, an apparatus for synchronizing a QP in a CR system is provided. The apparatus includes a QP scheduler that determines a channel for QP scheduling among a channel N and neighbor channels of the channel N, and a controller that configures control information including QP scheduled channel information and that broadcasts the control information including QP scheduled channel information.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 3 illustrates an example of QP scheduling synchronization in a Cognitive Radio (CR) system according to an exemplary embodiment of the present invention;

DETAILED DESCRIPTION OF THE INVENTION

FIGS. 2 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged communication system.

Preferred embodiments of the present invention will be described herein below with reference to the accompanying drawings. In the following description, well-known functions or constructions are not described in detail since they would obscure the invention in unnecessary detail. Terms described below, which are defined considering functions in the present invention, can be different depending on user and operator's intention or practice. Therefore, the terms should be defined on the basis of the disclosure throughout this specification.

Hereinafter, a method and apparatus for synchronizing a Quiet Period (QP) in a Cognitive Radio (CR) system will be described.

Figure 2:
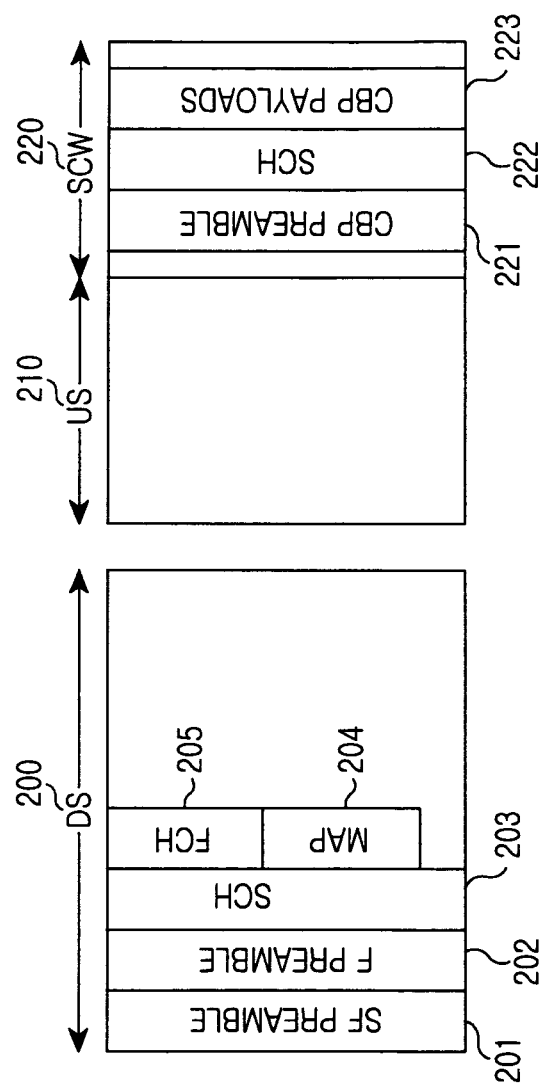
FIG. 2 illustrates an Institute of Electrical and Electronics Engineers (IEEE) 802.22 frame structure according to an exemplary embodiment of the present invention.

FIG. 2 illustrates an Institute of Electrical and Electronics Engineers (IEEE) 802.22 frame structure according to an exemplary embodiment of the present invention.

Referring to FIG. 2, the frame is divided into a Down-Stream (DS) 200, an Up-Stream (US) 210, and a Self-Coexistence Window (SCW) 220. The DS 200 is divided into a superframe preamble 201, a frame preamble 202, a Superframe Control Header (SCH) 203, a MAP 204 which is configuration information of bursts, a Frame Control Header (FCH) 205, and a data burst duration.

The preamble symbols 201 and 202 are followed by the SCH 203 located in a 1' frame of a superframe. A Base Station (BS) may schedule the SCW 220 in an end portion of the frame. The SCW 220 is a duration in which a Coexistence Beacon Protocol (CBP) packet is transmitted. In general, the SCW 200 includes not only CBP packets 223 and one preamble symbol 221 but also an SCH 222 which carries the same Information Element (IE) as that carried by the SCH 203.

Meanwhile, the BS of the CR system broadcasts QP scheduling information to a neighbor BS or receives QP scheduling information of the neighbor BS by using the SCH 203 or 222 or the CBP packets 223. The neighbor BS regulates its QP transmission time by considering the received QP scheduling information.

FIG. 3 illustrates an example of QP scheduling synchronization in a CR system according to an exemplary embodiment of the present invention.

Referring to FIG. 3A, a BS performs channel sensing on an inter-frame basis and an intra-frame basis, which will be hereinafter referred to respectively as intra-frame sensing and inter-frame sensing. In-band inter-frame sensing is performed among a plurality of superframes. The intra-frame sensing is performed within one superframe.

To perform the inter-frame sensing, the BS broadcasts a Time To Quiet Period (TTQP) value and a Duration of Quiet Period (DQP) value or receives these values from a neighbor BS by using the SCH 203 or 222 or the CBP packets 223. The TTQP indicates a time duration between a time of transmitting this information and a next scheduled QP. The DQP indicates a duration of the next scheduled QP.

To perform the intra-frame sensing, the BS broadcasts various values (i.e., an intra-frame sensing cycle length, an intra-frame sensing cycle offset, an intra-frame sensing cycle frame bitmap, and an intra-frame sensing duration) or receives these values from the neighbor BS by using the SCH 203 or 222 or the CBP packets 223 (see FIG. 3B).

The intra-frame sensing cycle length indicates the number of superframes for intra-frame sensing. The intra-frame sensing cycle offset is an offset indicating a duration from an SCH transmission time to a start of a $1^{st}$ superframe in a current intra-frame sensing cycle. The intra-frame sensing cycle frame bitmap indicates whether intra-frame sensing of a specific frame is performed in a specific superframe. The intra-frame sensing duration indicates a duration of intra-frame sensing.

In a QP scheduling synchronization operation of the BS, as soon as the BS receives QP information (i.e., a TTQP, a DQP, an intra-frame sensing cycle length, an intra-frame sensing cycle offset, an intra-frame sensing cycle frame bitmap, an intra-frame sensing duration, and the like) from at least one neighbor BS, the BS changes its QP information according to the following procedure.

When a superframe is synchronized and an intra-frame sensing quiet period (hereinafter, a $1^{st}$ QP) starts at an end of a frame, the BS synchronizes the $1^{st}$ QP by controlling the intra-frame sensing cycle, the intra-frame sensing cycle frame bitmap, and the intra-frame sensing duration according to QP information received from the neighbor BSs.

Meanwhile, to synchronize an inter-frame sensing quiet period (hereinafter, a $2^{nd}$ QP), the BS uses QP information (i.e., TTQP and DQP) included in the SCH. However, the BS additionally applies a random mechanism to determine whether QP scheduling will be changed. The random mechanism significantly alleviates a ping-pong effect, and conforms to the following rule.

If a time including a next $2^{nd}$ QP of a BS_1 is greater than a time including a next $2^{nd}$ QP of a BS_2, in order to synchronize with the $2^{nd}$ QP of the different neighbor BS_2, the BS_1 modifies only its $2^{nd}$ QP scheduling.

For example, it is assumed that the BS_1 receives QP information from the collocated BS_2 by using an SCH. In this case, if TTQP_BS_1>TTQP_BS_2, to synchronize with QP scheduling of the BS_2, the BS_1 modifies its QP scheduling by considering the QP scheduling of the BS_2.

If QP modification has already been performed by the BS_2 so that QP scheduling is achieved according to the QP of the BS_1 before QP modification of the BS_1 is advertised, the BS_1 cancels scheduled QP modification. After the last notification, there is a possible case where new information on a QP received by the BS_1 from the BS_2 may change. In this case, the BS_1 cancels scheduled modification of a current QP, and reschedules the QP by considering new parameters received from the BS_2. The BS_1 performs QP modification with respect to all other possible cases.

As described above, neighbor BSs synchronize not only their frames but also their QPs. Therefore, all CR networks located nearby remain quiet during the same time period, and receive signals only from existing users.

To solve the aforementioned problem described in FIG. 1 for a case where QP scheduling synchronization is not provided to neighbor BSs using an in-band channel and a case where unnecessary QP scheduling synchronization is provided to neighbor BSs using an out-band channel, the present invention allows an SCH format to include a QP scheduled channel number and a QP scheduled out-band channel number as shown in Table 1, Table 2, Table 3, and Table 4 below. It is assumed that a channel N is currently in use.

TABLE 1

| Syntax | Size | Notes |
|---|---|---|
| Superframe_Control_Header_Format( ) | | |
| ... | ... | ... |
| QP Scheduled Channel Number (QP_SCN) | 2 bits | indicates which in-band channel the QP is scheduled on. 00: present channel N 01: channel N − 1 10: channel N + 1 11: reserved |
| ... | ... | ... |

The QP scheduled channel number information indicates a specific channel according to which the BS regulates QP scheduling. For example, if the QP scheduling channel number has a value '00', '01', or '10', it indicates that QP scheduling is regulated according to a present channel N, a channel N−1, or a channel N+1, respectively.

Figure 1A:
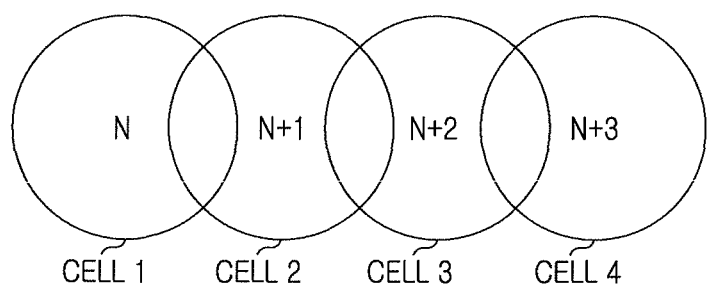
FIGS. 1A, 1B and 1C illustrate an example of Quiet Period (QP) scheduling.

For example, in FIG. 1A, the cell 1 schedules and broadcast a QP for the channel N. In this case, the cell 2 using the channel N+1 regulate QP scheduling of the channel N+1 by considering QP scheduling of the cell 1. Thereafter, the cell 2 using the channel N+1 adjusts timing to the QP scheduling of the cell 1, and broadcasts QP scheduling information based on the channel N. In the conventional method, the cell 3 using the channel N+2 regulates QP scheduling of the channel N+2 by considering QP scheduling of the cell 2. However, in the present invention, by using the QP scheduled channel number information, the cell 3 can know that the QP scheduling of the cell 2 is based on the channel N. Therefore, since the channel N is not an in-band channel, QP scheduling information of the cell 2 is ignore. As a result, the cell 3 and the cell 4 are not synchronized with the QP scheduling of the cell 1.

TABLE 2

| Syntax | Size | Notes |
|---|---|---|
| Superframe_Control_Header_Format( ) | | |
| ... | ... | ... |
| QP Scheduled Channel Number (QP_SCN) | 2 bits | indicates which in-band channel the QP is scheduled on. 00: present channel N 01: channel N − 1 10: channel N + 1 11: out-band channel |
| If QP-SCN=1 { QP Scheduled Out-band Channel Number} | 8 bits | Indicates which out-band channel the QP is scheduled on. |

In Table 1 above, a value "11" of QP scheduled channel number information is reserved to indicate that QP scheduling is regulated based on an out-band channel. QP scheduled out-band channel number information is used to indicate a specific out-band channel according to which QP scheduling is regulated.

Figure 1B:
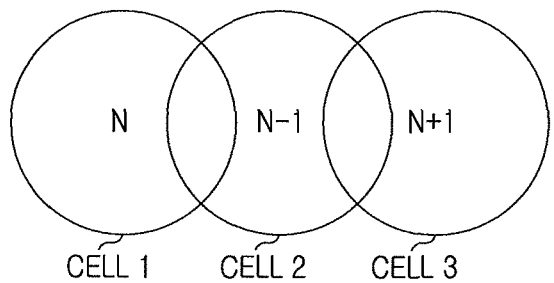

For one example, in FIG. 1B, the cell 2 adjusts timing to QP scheduling of the cell 1, and broadcast QP scheduling information based on the channel N (i.e., QP scheduled channel number: 10). Thereafter, the cell 3 regulates and broadcasts QP scheduling obtained from QP scheduling information of the cell 2 using the channel N−1. In the conventional method, the cell 3 using the channel N+1 ignores QP scheduling information provided from the cell 2 using the channel N−1 which is an out-band channel.

Figure 1C:
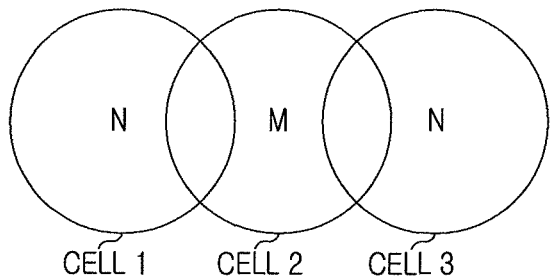

For another example, in FIG. 1C, the cell 1 broadcasts QP information based on the channel N. Upon receiving this information, the cell 2 ignores the QP information of the channel N which is an out-band channel. If required, the cell 2 sets QP scheduling information (i.e., QP scheduled channel number: 11), and then sets the QP scheduled out-band channel number to the channel N and relays the QP scheduling information. Then, the cell 2 performs QP scheduling based on the channel N by using the relayed QP scheduling information. Herein, QP scheduling information for the channel M is ignored in the cell 1 or the cell 3.

TABLE 3

| Syntax | Size | Notes |
|---|---|---|
| Superframe_Control_Header_Format( ) | | |
| ... | ... | ... |
| QP Scheduled Channel Number (QP_SCN) | 8 bits | indicates which in-band channel the QP is scheduled on. |
| ... | ... | ... |

Unlike in Table 1 and Table 2 above, Table 3 shows a specific channel according to which QP scheduling is regulated irrespective of whether the channel is an in-band channel or an out-band channel.

TABLE 4

| Syntax | Size | Notes |
|---|---|---|
| Superframe_Control_Header_Format( ) | | |
| ... | ... | ... |
| Numbers of QP schedules (M) | 4 bits | To indicate how many QP schedules the present SCH/CBP is carrying |
| For i=1 to M, i++ { QP Scheduled Channel Number (QP-SCN) | 8 bits | Indicates which channel number the QP is scheduled on. |

Table 4 above shows an SCH format structure when a plurality of QP information is included using multiple channels. M indicates the number of channels for QP scheduling. Therefore, QP scheduling information can be transmitted for M channels.

Figure 4:
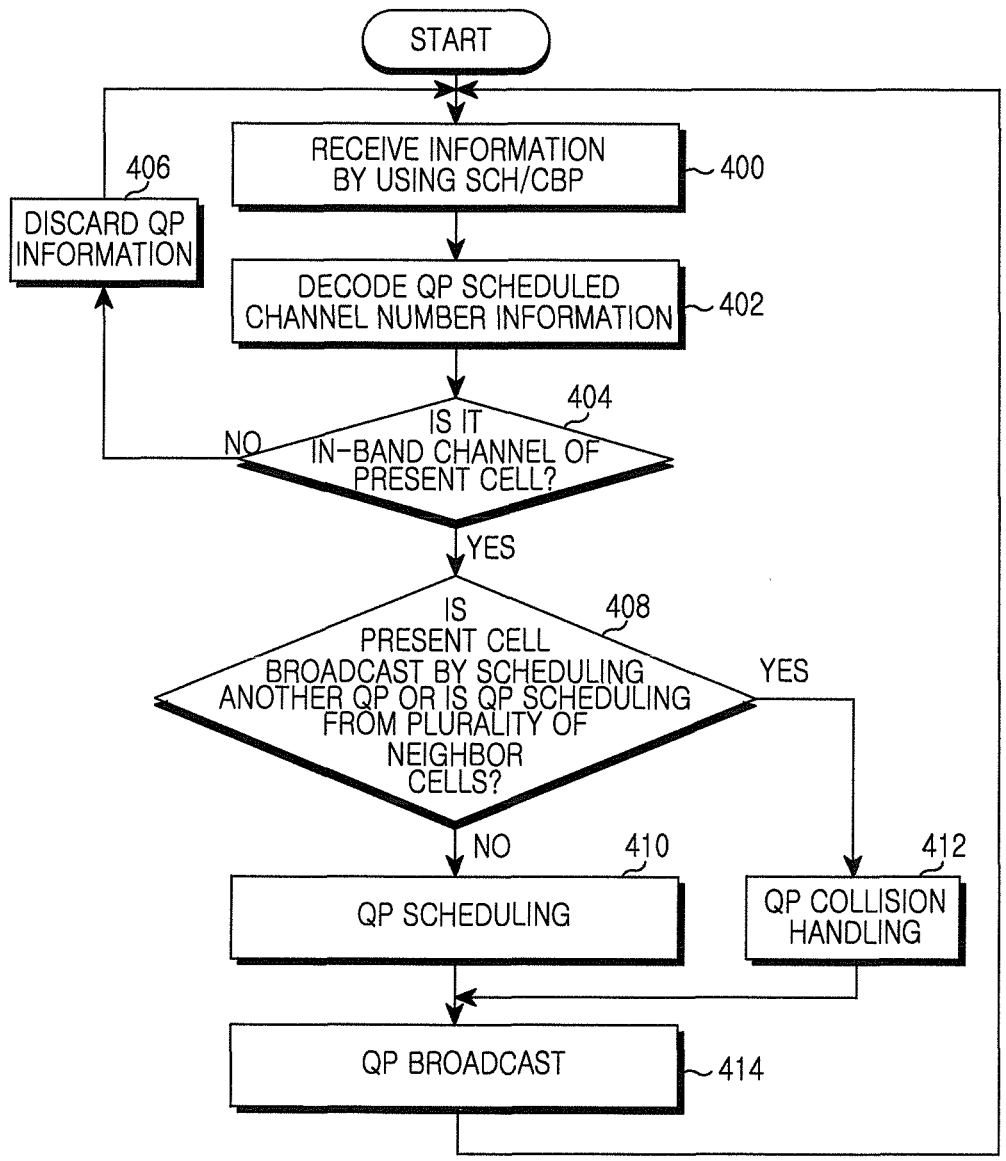
FIG. 4 illustrates a process of synchronizing QP scheduling information in a CR system according to an exemplary embodiment of the present invention.

FIG. 4 illustrates a process of synchronizing QP scheduling information in a CR system according to an exemplary embodiment of the present invention.

Referring to FIG. 4, a BS receives QP scheduling information from a neighbor BS by using an SCH or a CBP packet in step 400. For inter_frame sensing, the QP scheduling information may include a TTQP and a DQP. For intra-frame sensing, the QP scheduling information may include an intra-frame sensing cycle length, an intra-frame sensing cycle offset, an intra-frame sensing cycle frame bitmap, and an intra-frame sensing duration.

In particular, in the present invention, QP scheduled channel number information or QP scheduled out-band channel number information is further included to solve a problem occurring in a case where QP scheduling synchronization is not provided to neighbor BSs using an in-band channel (see FIGS. 1B and 1C) and a case where unnecessary QP scheduling synchronization is provided to neighbor BSs using an out-band channel (see FIG. 1A).

In step 402, the BS decodes the received SCH or CBP packet, and determines a specific channel according to which QP scheduling is performed. This can be determined by using the QP scheduled channel number information or the QP scheduled out-band channel number information.

In step 404, by using the QP scheduled channel number information, the BS determines whether a present channel is an in-band channel. If the present channel is an out-band channel, proceeding to step 406, the BS discards QP information received from a neighbor BS. This is because QP scheduling regulation is not necessary for the out-band channel.

Otherwise, if the present channel is the in-band channel, proceeding to step 408, it is determined whether a present cell is broadcast by scheduling another QP, or whether QP scheduling information is received from a plurality of neighbor cells.

If it is determined in step 408 that the present cell is not broadcast by scheduling another QP or that QP scheduling information is not received from a plurality of neighbor cells, proceeding to step 410, QP scheduling is performed according to QP information received from the neighbor BS in step 400.

Otherwise, if it is determined in step 408 that the present cell is broadcast by scheduling another AP or that QP scheduling information is received from a plurality of neighbor BSs, proceeding to step 412, a QP collision handling process is performed. In this case, QP information having a minimum TTQP value is used among a plurality of QP information.

For example, in FIG. 1, if the cell 1 transmits QP information based on the channel N to the cell 2, the cell 2 confirms an in-band channel by using the QP scheduled channel number information transmitted by the cell 1. When QP information based on another cell is previously broadcast or when at least one QP information is received from other neighbor cells, an inter-frame sensing duration is determined according to the QP information having the minimum TTQP value.

Otherwise, if the QP information based on another cell is not broadcast by the cell 2 or if at least one QP information is not received from other neighbor cells, an inter-frame sensing duration is determined according to the QP information of the cell 1, and the determined inter-frame sensing duration is broadcast.

In step 414, the BS broadcasts the QP scheduling information determined in step 410 or 412.

Thereafter, the procedure of FIG. 4 ends.

Figure 5:
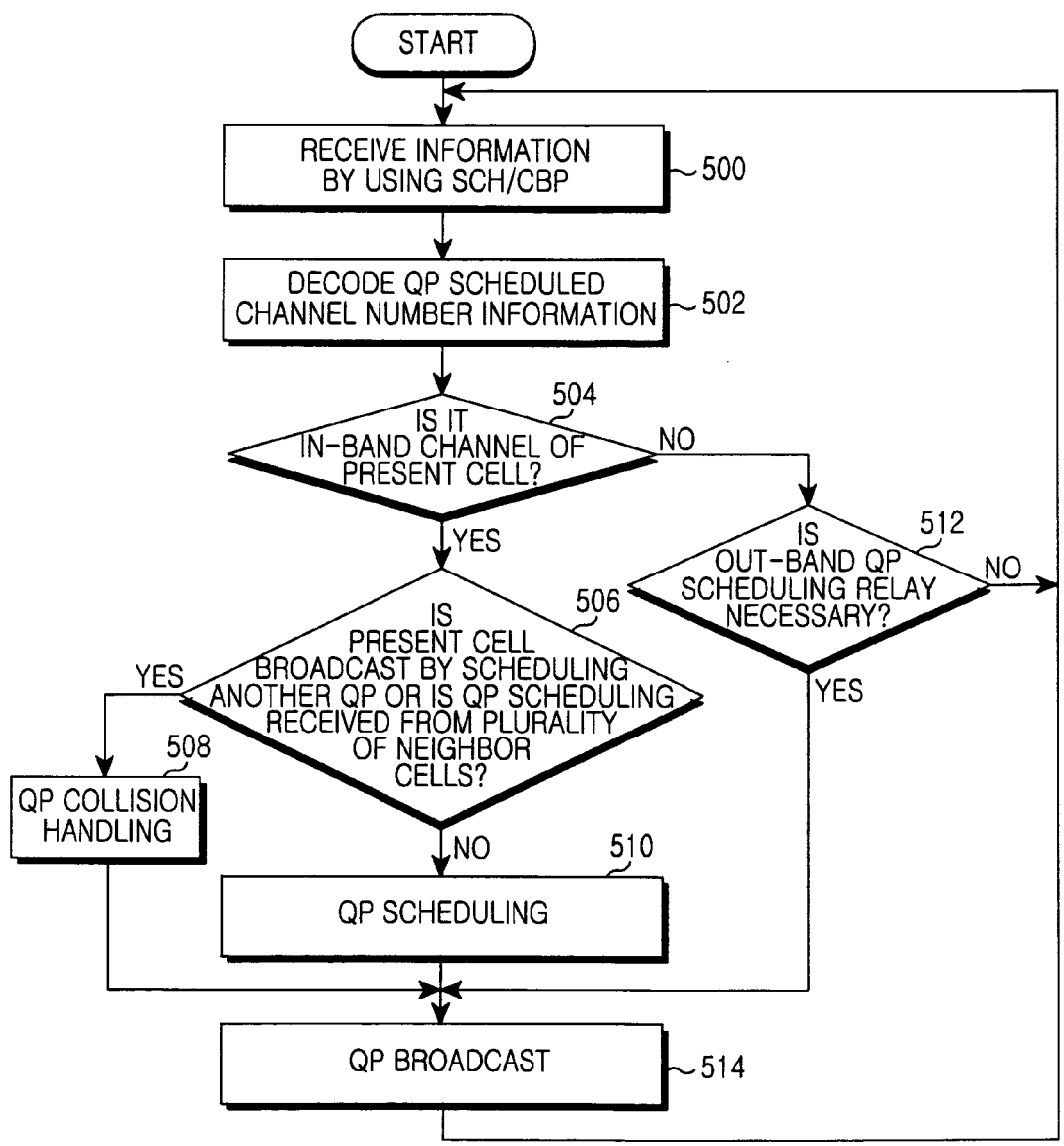
FIG. 5 illustrates a process of synchronizing QP scheduling information in a CR system according to another exemplary embodiment of the present invention.

FIG. 5 illustrates a process of synchronizing QP scheduling information in a CR system according to another exemplary embodiment of the present invention.

Referring to FIG. 5, in step 500, a BS receives QP scheduling information from a neighbor BS by using an SCH or a CBP packet. In step 502, the BS decodes the received SCH or CBF packet, and determines a specific channel according to which a QP is scheduled.

In step 504, the BS determines whether QP information is information based on an in-band channel. If the QP information is based on an out-band channel, proceeding to step 512, the BS determines whether out-band QP scheduling relay is necessary. If the out-band QP scheduling relay is not necessary, the received QP information is discarded. Otherwise, if the out-band QP scheduling relay is necessary, the received QP information is broadcast.

For example, in FIG. 1C, when the cell 2 receives the QP information based on the channel N from the cell 1, the QP information based on the channel N is relayed since the channel N is used in the cell 3. If the cell 3 uses an out-band channel of a channel M+1 other than the channel N, the QP information based on the channel N is discarded from the channel 1.

Otherwise, if the present channel is the in-band channel, proceeding to step 506, it is determined whether a present cell is broadcast by scheduling another QP, or whether QP scheduling information is received from a plurality of neighbor cells.

If it is determined in step 506 that the present cell is not broadcast by scheduling another QP or that QP scheduling information is not received from a plurality of neighbor cells, proceeding to step 510, QP scheduling is performed according to QP information received from the neighbor BS in step 500.

Otherwise, if it is determined in step 506 that the present cell is broadcast by scheduling another AP or that QP scheduling information is received from a plurality of neighbor BSs, proceeding to step 508, a QP collision handling process is performed. In this case, QP information having a minimum TTQP value is used among a plurality of QP information.

In step 514, the BS broadcasts the QP scheduling information determined in step 508 or 512.

Thereafter, the procedure of FIG. 5 ends.

Figure 6:
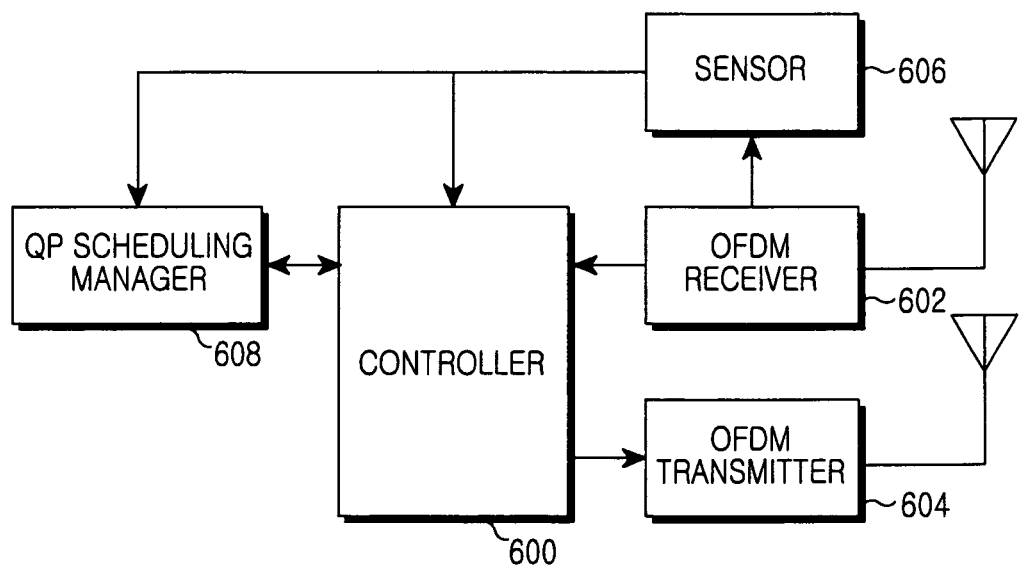
FIG. 6 illustrates an apparatus for sharing QP scheduling information in a CR system according to an exemplary embodiment of the present invention.

FIG. 6 illustrates an apparatus for sharing QP scheduling information in a CR system according to an exemplary embodiment of the present invention.

Referring to FIG. 6, a BS includes a controller 600, an Orthogonal Frequency Division Multiplexing (OFDM) receiver 602, an OFDM transmitter 604, a sensor 606, and a QP scheduling manager 608.

The sensor 606 provides the controller 600 with channel information detected by scanning in-band channels and out-band channels in an inter-frame sensing duration and an intra-frame sensing duration.

The OFDM receiver 602 converts a Radio Frequency (RF) signal received from a neighbor BS or a Mobile Station (MS) into a base-band signal, and converts the base-band analog signal into digital sample data. Then, the OFDM receiver 602 performs OFDM demodulation on the sample data and outputs subcarrier values. The OFDM demodulation includes Cyclic Prefix (CP) removal, a Fast Fourier Transform (FFT) operation, and so forth. For example, the OFDM receiver 602 receives QP information based on a channel N from at least one neighbor BS.

The controller 600 provides overall control to the BS. In particular, the controller 600 exchanges QP information with the neighbor BSs through negotiation, and thereafter determines the inter-frame sensing duration and the intra-frame sensing duration. The QP information is provided to the QP scheduling manager 608. The controller 600 performs a suitable process for information provided from the OFDM receiver 602, and provides the process result to the OFDM transmitter 604.

The controller 600 determines whether the channel N is an in-band channel by using the QP information. If the channel N is an out-band channel, the controller 600 determines whether scheduling is necessary for the out-band channel.

The OFDM transmitter 604 performs coding and modulation on data received from the controller 600 according to a predetermined modulation level (i.e., Modulation and Coding Scheme (MCS) level). Further, the modulated data is transformed into sample data (i.e., OFDM symbol) by performing Inverse Fast Fourier Transform (IFFT). Then, the sample data is converted into an analog signal, and thereafter the analog signal is converted into an RF signal and is then transmitted through an antenna. For example, scheduled QP information is broadcast.

The QP scheduling manager 608 receives QP information from the controller 600, and updates or stores information on the inter-frame sensing duration and the intra-frame sensing duration. In addition, when the channel N is the in-band channel, QP scheduling is performed according to the received QP information based on the channel N.

If the channel N is the out-band channel, the QP scheduling manager 608 determines whether scheduling is necessary for the out-band channel. Thereafter, if scheduling is not necessary for the out-band channel, the QP scheduling manager 608 discards the received QP information based on the channel N. Otherwise, if scheduling is necessary for the out-band channel, the QP scheduling manager 608 relays the received QP information based on the channel N to another neighbor BS.

The QP information includes information for intra-frame sensing and inter-frame sensing, a QP scheduled channel number, and a QP scheduled out-band channel number.

When the QP information based on the channel N is broadcast to another neighbor BS or the QP information based on the channel N is received from a plurality of neighbor BSs, the QP scheduling manager 608 changes the QP information according to another QP information having an early QP start point.

According to exemplary embodiments of the present invention, a CR system includes information capable of distinguishing an in-band channel and an out-band channel. Therefore, QP scheduling synchronization can be provided to neighbor BSs using the in-band channel, and unnecessary QP scheduling synchronization is not provided to neighbor BSs using the out-band channel.

While the present invention has been shown and described with reference to certain exemplary embodiments thereof, it will be understood by those skilled in the art that various changes in form and details may be made therein without departing from the spirit and scope of the present invention as defined by the appended claims and their equivalents. Therefore, the scope of the invention is defined not by the detailed description of the invention but by the appended claims and their equivalents, and all differences within the scope will be construed as being included in the present invention.

What is claimed is:

1. A method of synchronizing a Quiet Period (QP) in a Cognitive Radio (CR) system, the method comprising:

receiving, by a Base Station (BS), QP synchronization information on a channel N from at least one neighbor BS;

decoding the QP synchronization information;

determining whether the channel N is an in-band channel using the QP synchronization information;

if the channel N is the in-band channel, determining whether the BS is currently synchronized based on another QP synchronization information on a channel M and the synchronized another QP synchronization information is broadcasted, or determining whether the QP synchronization information is received from a plurality of neighbor BSs; and if the BS is not currently synchronized based on another QP synchronization information on a channel M and the synchronized another QP synchronization information is not broadcasted, or the QP synchronization information is not received from a plurality of neighbor BSs, synchronizing a QP of the channel N, based on the QP synchronization information.

2. The method of claim 1, further comprising:
if the channel N is an out-band channel, determining whether scheduling is necessary for the out-band channel.

3. The method of claim 2, further comprising one of:
if scheduling is not necessary for the out-band channel, discarding the received QP synchronization information on the channel N; and
if scheduling is necessary for the out-band channel, relaying the received QP synchronization information on the channel N to another neighbor BS.

4. The method of claim 1, wherein the QP synchronization information comprises at least one of information for intra-frame sensing and inter-frame sensing, a QP scheduled channel number, and a QP scheduled out-band channel number.

5. The method of claim 1, further comprising, upon broadcasting the QP synchronization information on the channel N to another neighbor BS or upon receiving the QP synchronization information on the channel N from a plurality of neighbor BSs, changing the QP synchronization information according to QP information having an early QP start time.

6. The method of claim 1, further comprising broadcasting the synchronized QP synchronization information.

7. A Base Station (BS) apparatus for synchronizing a Quiet Period (QP) in a Cognitive Radio (CR) system, the apparatus comprising:
a receiver configured to receive QP synchronization information on a channel N from at least one neighbor BS and to decode the QP synchronization information;
a controller configured to determine whether the channel N is an in-band channel using the QP synchronization information and to determine whether the BS is currently synchronized based on another QP synchronization information on a channel M and the synchronized another QP synchronization information is received from a plurality of neighbor BSs, if the channel N is the in-band channel; and
a QP scheduling manager configured to synchronize a QP of the channel N, based on the QP synchronization information, if the BS is not currently synchronized based on another QP information is not broadcasted, or the QP synchronization information is not received from a plurality of neighbor BSs.

8. The apparatus of claim 7, wherein, if the channel N is an out-band channel, the QP scheduling manager determines whether scheduling is necessary for the out-band channel.

9. The apparatus of claim 8, wherein the QP scheduling manager is configured to one of:
if scheduling is not necessary for the out-band channel, discard the received QP synchronization information on the channel N; and
if scheduling is necessary for the out-band channel, relay the received QP synchronization information on the channel N to another neighbor BS.

10. The apparatus of claim 7, wherein the QP synchronization information comprises at least one of information for intra-frame sensing and inter-frame sensing, a QP scheduled channel number, and a QP scheduled out-band channel number.

11. The apparatus of claim 7, wherein, upon broadcasting the QP synchronization information for the channel N to another neighbor BS or upon receiving the QP synchronization information on the channel N from a plurality of neighbor BSs, the QP scheduling manager changes the QP information according to QP information having an early QP start time.

12. The apparatus of claim 7, further comprising a transmitter configured to broadcast the synchronized QP synchronization information.

13. A method of synchronizing a Quiet Period (QP) in a Cognitive Radio (CR) system, the method comprising:
receiving, by a Base Station (BS) using a channel M, QP synchronization information on a channel N from a neighbor BS;
determining whether the channel N is an in-band channel using the QP synchronization information on a channel N;
if the channel N is the in-band channel, determining whether another QP synchronization information is previously broadcasted or QP synchronization information is received from a plurality of another neighbor BSs;
if another QP synchronization information is previously broadcasted or QP synchronization information is received from a plurality of other neighbor BSs, determining new QP synchronization information according to QP information having an early QP start time and broadcasting the new QP synchronization information; and
if another QP synchronization information is not previously broadcasted or QP synchronization information is not received from the plurality of other neighbor BSs, broadcasting the QP synchronization information on a channel N.

14. An apparatus for synchronizing a Quiet Period (QP) in a Cognitive Radio (CR) system, the apparatus comprising:
a receiver configured to receive QP synchronization information on a channel N from a neighbor BS;
a controller configured to determine whether the channel N is an in-band channel using the QP synchronization information on a channel N, and if the channel N is the in-band channel, determine whether another QP synchronization information is previously broadcasted or QP synchronization information is received from a plurality of other neighbor BSs; and
a QP scheduler configured to determine new QP synchronization information according to QP information having an early QP start time and broadcast the new QP synchronization information, if another QP synchronization information is previously broadcasted or QP synchronization information is received from the plurality of other neighbor BSs and if another QP synchronization information is not previously broadcasted or QP synchronization information is not received from a plurality of another neighbor BSs, the QP scheduler broadcasts the QP synchronization information on a channel N.

* * * * *